United States Patent
Durbhakula (10) Patent No.: US 12,380,023 B2
(45) Date of Patent: Aug. 5, 2025

(54) PROVIDING ADAPTIVE CACHE BYPASS IN PROCESSOR-BASED DEVICES

(71) Applicant: QUALCOMM Incorporated, San Diego, CA (US)

(72) Inventor: Suryanarayana Murthy Durbhakula, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 17/929,525

(22) Filed: Sep. 2, 2022

(65) Prior Publication Data

US 2024/0078178 A1   Mar. 7, 2024

(51) Int. Cl.
*G06F 12/0802* (2016.01)
*G06F 12/0888* (2016.01)

(52) U.S. Cl.
CPC ...... *G06F 12/0802* (2013.01); *G06F 12/0888* (2013.01); *G06F 2212/60* (2013.01)

(58) Field of Classification Search
CPC ............. G06F 12/0802; G06F 2212/60; G06F 12/0815; G06F 12/0811; G06F 12/0806; G06F 12/0808; G06F 12/0888
See application file for complete search history.

(56) References Cited

U.S. PATENT DOCUMENTS

| | | | |
|---|---|---|---|
| 7,694,075 B1 | 4/2010 | Feekes, Jr. | |
| 7,865,669 B2* | 1/2011 | Kornegay | G06F 12/0888 711/119 |
| 8,589,629 B2* | 11/2013 | Owen | G06F 12/126 711/129 |
| 9,086,974 B2* | 7/2015 | Busaba | G06F 9/467 |
| 11,775,046 B2* | 10/2023 | Olorode | G06F 12/0811 711/105 |
| 2013/0124799 A1 | 5/2013 | Hiniker-Roosa | |
| 2021/0089462 A1 | 3/2021 | Moyer et al. | |

OTHER PUBLICATIONS

International Search Report and Written Opinion for International Patent Application No. PCT/US2023/072438, mailed Nov. 20, 2023, 12 pages.

* cited by examiner

*Primary Examiner* — Henry Tsai
*Assistant Examiner* — Richard B Franklin
(74) *Attorney, Agent, or Firm* — W&T (57) ABSTRACT

Providing adaptive cache bypass in processor-based devices is disclosed. In some aspects, a processor-based device comprises a processor that comprises a cache. The processor is configured to calculate a cache result rate based on a first one or more outcomes of a corresponding first one or more cache requests to a cache region of the cache during a sampling period. The processor is further configured to determine that the cache result rate fails to satisfy a cache result requirement. The processor is also configured to, responsive to determining that the cache result rate fails to satisfy the cache result requirement, restrict access to the cache region of the cache subsequent to the sampling period.

15 Claims, 9 Drawing Sheets

PROVIDING ADAPTIVE CACHE BYPASS IN PROCESSOR-BASED DEVICES

BACKGROUND

I. Field of the Disclosure

The technology of the disclosure relates generally to the use of caches to reduce memory access latency in processor-based devices.

II. Background

Processor-based devices are subject to a phenomenon known as memory access latency, which is a time interval between the time a processor initiates a memory access request (i.e., by executing a memory load instruction) for data and the time the processor actually receives the requested data. In more extreme cases, memory access latency for a memory access request may be large enough that the processor is forced to stall further execution of instructions while waiting for a memory access request to be fulfilled. Accordingly, memory access latency is considered to be one of the factors having the biggest impact on the performance of modern processor-based devices.

One approach to minimizing the effects of memory access latency is the use of cache memory, also referred to simply as "cache." A cache is a memory device that has a smaller capacity than system memory, but can be accessed faster by a processor due to the type of memory used and/or the physical location of the cache relative to the processor. As a result, the cache can be used to store copies of data retrieved from frequently accessed memory locations in the system memory (or from a higher-level cache memory) to reduce memory access latency.

However, cache usage does not always result in improvements in memory access latency. Caches generally provide the best performance when the data being frequently accessed demonstrates temporal locality (i.e., a tendency for the same memory locations to be repeatedly accessed during a given time period while a program is executing) and/or spatial locality (i.e., a tendency for memory locations in close physical proximity to be accessed during program execution). However, some applications may tend to require frequent memory accesses that exhibit both low temporal locality and low spatial locality. Such applications may suffer from low cache hit rates that negatively impacts overall system performance due to the number of memory access requests that result in both an unsuccessful cache request and a subsequent request to system memory. In particular, some graphics workloads processed by graphics processing units (GPUs) can result in low cache hit rates to the GPU's read-only cluster caches (CCHEs).

SUMMARY OF THE DISCLOSURE

Aspects disclosed in the detailed description include providing adaptive cache bypass in processor-based devices. Related apparatus and methods are also disclosed. In this regard, in some exemplary aspects disclosed herein, a processor-based device provides a processor that comprises a cache and an adaptive bypass circuit. The adaptive bypass circuit tracks a cache result rate (e.g., a cache hit rate or a cache miss rate) and bypasses the cache for memory requests when the cache result rate fails to satisfy a cache result requirement (e.g., a cache hit threshold or a cache miss threshold). In exemplary operation, the processor (e.g., using the adaptive bypass circuit) calculate a cache result rate based on a first one or more outcomes of a corresponding first one or more cache requests to a cache region of the cache during a sampling period (which may comprise, e.g., a period during which a specified number T of cache requests are received). Upon concluding the sampling period, the processor determines whether the cache result rate fails to satisfy a cache result requirement, and, if so, the processor restricts access to the cache region of the cache subsequent to the sampling period.

Some aspects may provide that the cache region to which the first one or more cache requests are directed may comprise the entire cache. In such aspects, the processor is configured restrict access to the cache region of the cache by disabling the cache (such that subsequent memory access requests are fulfilled directly from a next-higher-level cache, or, if a next-higher-level cache is not provided, from system memory without accessing the cache). According to some such aspects, the processor may then wait for a period of time (a "reset interval"), and then re-enable the cache and invalidate contents of the cache. The operations for calculating the cache result rate and determining whether the cache result rate fails to satisfy the cache result requirement can then be repeated if desired. Some such aspects may provide that disabling the cache may comprise disabling a data memory of the cache while maintaining operation of a tag memory of the cache. Disabling the data memory in this manner may result in power savings in addition to addressing memory latency issues. The processor in such aspects may then continue to update the cache result rate based on a second one or more outcomes of a corresponding second one or more cache requests to the cache and may later determine that the cache result rate now satisfies the cache result requirement. In that case, the processor re-enables the cache and invalidate the contents of the cache.

In some aspects, the cache region may comprise a single cache line of the cache, or may comprise a subset comprising a plurality of cache lines of the cache. According to such aspects, the adaptive bypass circuit of the processor maintains a tracking table that stores a plurality of entries that each correspond to a cache region (i.e., each entry corresponds to a single cache line or to a subset of the cache that includes multiple cache lines). The processor calculates that calculate the cache result rate by determining, for each cache request during the sampling period, whether an entry for the corresponding cache region exists in the tracking table and adds such an entry if needed. The processor then updates a value of a cache miss rate indicator of the entry if the cache request results in a cache miss on the cache. If the cache miss rate indicator of an entry exceeds a cache miss threshold, the processor sets a bypass indicator of the entry. After the sampling period concludes, when the processor receives a cache request to a cache region of the cache, the processor determines whether the bypass indicator of the entry corresponding to the cache region within the tracking table is set. If so, the processor bypasses the cache for that cache request. Some aspects may provide that the processor may then continue to update the value of the cache miss rate indicator of entries based on a second one or more outcomes of a corresponding second one or more cache requests to the cache and may later determine that the cache miss rate of an entry now does not exceed the cache miss threshold. In that case, the processor clears the bypass indicator for the entry.

In another aspect, a processor-based device is provided. The processor-based device comprises a processor that comprises a cache. The processor is configured to calculate a cache result rate based on a first one or more outcomes of a corresponding first one or more cache requests to a cache region of the cache during a sampling period. The processor is further configured to determine that the cache result rate fails to satisfy a cache result requirement. The processor is also configured to, responsive to determining that the cache result rate fails to satisfy the cache result requirement, restrict access to the cache region of the cache subsequent to the sampling period.

In another aspect, a processor-based device is provided. The processor-based device comprises means for calculating a cache result rate based on a first one or more outcomes of a corresponding first one or more cache requests to a cache region of a cache during a sampling period. The processor-based device further comprises means for determining that the cache result rate fails to satisfy a cache result requirement. The processor-based device also comprises means for restricting access to the cache region of the cache subsequent to the sampling period, responsive to determining that the cache result rate fails to satisfy the cache result requirement.

In another aspect, a method for providing adaptive cache bypass is provided. The method comprises calculating, using an adaptive bypass circuit of a processor-based device, a cache result rate based on a first one or more outcomes of a corresponding first one or more cache requests to a cache region of a cache during a sampling period. The method further comprises determining that the cache result rate fails to satisfy a cache result requirement. The method also comprises, responsive to determining that the cache result rate fails to satisfy the cache result requirement, restricting access to the cache region of the cache subsequent to the sampling period.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include providing adaptive cache bypass in processor-based devices. Related apparatus and methods are also disclosed. In this regard, in some exemplary aspects disclosed herein, a processor-based device provides a processor that comprises a cache and an adaptive bypass circuit. The adaptive bypass circuit tracks a cache result rate (e.g., a cache hit rate or a cache miss rate) and bypasses the cache for memory requests when the cache result rate fails to satisfy a cache result requirement (e.g., a cache hit threshold or a cache miss threshold). In exemplary operation, the processor (e.g., using the adaptive bypass circuit) calculate a cache result rate based on a first one or more outcomes of a corresponding first one or more cache requests to a cache region of the cache during a sampling period (which may comprise, e.g., a period during which a specified number T of cache requests are received). Upon concluding the sampling period, the processor determines whether the cache result rate fails to satisfy a cache result requirement, and, if so, the processor restricts access to the cache region of the cache subsequent to the sampling period.

Some aspects may provide that the cache region to which the first one or more cache requests are directed may comprise the entire cache. In such aspects, the processor is configured restrict access to the cache region of the cache by disabling the cache, such that subsequent memory access requests are fulfilled directly from system memory or a higher level cache without accessing the cache. According to some such aspects, the processor may then wait for a period of time (a "reset interval"), and then re-enable the cache and invalidate contents of the cache. The operations for calculating the cache result rate and determining whether the cache result rate fails to satisfy the cache result requirement can then be repeated if desired. Some such aspects may provide that disabling the cache may comprise disabling a data memory of the cache while maintaining operation of a tag memory of the cache. The processor may then continue to update the cache result rate based on a second one or more outcomes of a corresponding second one or more cache requests to the cache and may later determine that the cache result rate now satisfies the cache result requirement. In that case, the processor re-enables the cache and invalidate the contents of the cache.

In some aspects, the cache region may comprise a single cache line of the cache, or may comprise a subset comprising a plurality of cache lines of the cache. According to such aspects, the adaptive bypass circuit of the processor maintains a tracking table that stores a plurality of entries that each correspond to a cache region (i.e., each entry corresponds to a single cache line or to a subset of the cache that includes multiple cache lines). The processor calculates that calculate the cache result rate by determining, for each cache request during the sampling period, whether an entry for the corresponding cache region exists in the tracking table and adds such an entry if needed. The processor then updates a value of a cache miss rate indicator of the entry if the cache request results in a cache miss on the cache. If the cache miss rate indicator of an entry exceeds a cache miss threshold, the processor sets a bypass indicator of the entry. After the sampling period concludes, when the processor receives a cache request to a cache region of the cache, the processor determines whether the bypass indicator of the entry corresponding to the cache region within the tracking table is set. If so, the processor bypasses the cache for that cache request. Some aspects may provide that the processor may then continue to update the value of the cache miss rate indicator of entries based on a second one or more outcomes of a corresponding second one or more cache requests to the cache and may later determine that the cache miss rate of an entry now does not exceed the cache miss threshold. In that case, the processor clears the bypass indicator for the entry.

Figure 1:
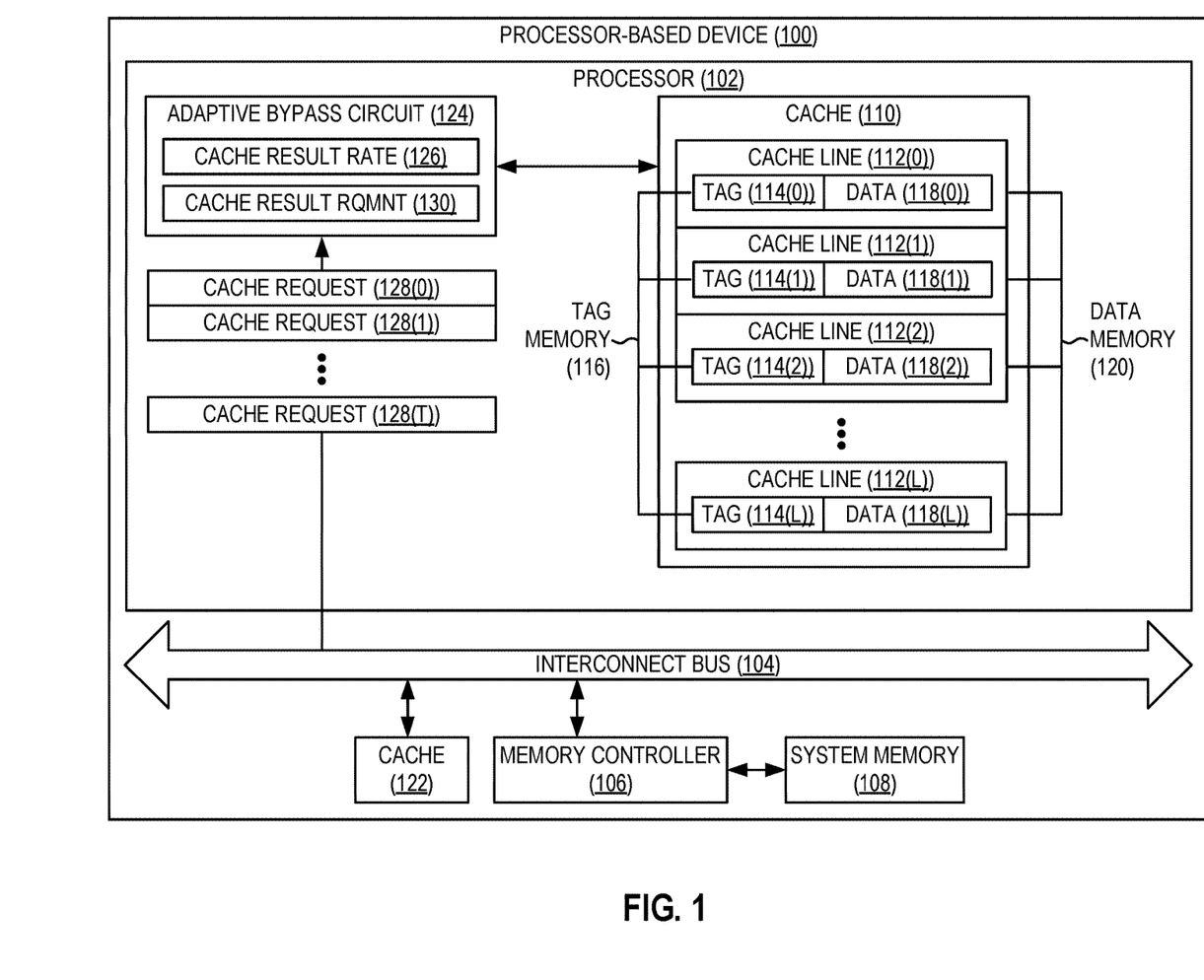
FIG. 1 is a block diagram of an exemplary processor-based device including an adaptive bypass circuit for providing adaptive cache bypass.

In this regard, FIG. 1 illustrates an exemplary processor-based device 100 that provides a processor 102 for providing adaptive cache bypass. The processor 102 in some aspects may comprise a central processing unit (CPU) or a graphics processing unit (GPU) having one or more processor cores, and in some exemplary aspects may be one of a plurality of similarly configured processors (not shown) of the processor-based device 100. The processor 102 is communicatively coupled to an interconnect bus 104, which in some embodiments may include additional constituent elements (e.g., a bus controller circuit and/or an arbitration circuit, as non-limiting examples) that are not shown in FIG. 1 for the sake of clarity. The processor 102 is also communicatively coupled, via the interconnect bus 104, to a memory controller 106 that controls access to a system memory 108 and manages the flow of data to and from the system memory 108. The system memory 108 provides addressable memory used for data storage by the processor-based device 100, and as such may comprise synchronous dynamic random access memory (SDRAM), as a non-limiting example.

The processor 102 of FIG. 1 further includes a cache 110 that may be used to cache local copies of frequently accessed data within the processor 102 for quicker access (e.g., by a memory access stage of an execution pipeline (not shown) of the processor 102). The cache 110 provides a plurality of cache lines 112(0)-112(L) for storing frequently access data retrieved from the system memory 108. The cache lines 112(0)-112(L) comprise respective tags 114(0)-114(L) (collectively, tag memory 116), each of which store information that enables the corresponding cache lines 112(0)-112(L) to be mapped to unique memory addresses. The cache lines 112(0)-112(L) further comprise data 118(0)-118(L) (collectively, data memory 120) in which the actual data retrieved from the system memory 108 or from a higher-level cache is stored. It is to be understood that the cache lines 112(0)-112(L) may include other data elements, such as validity indicators and/or dirty data indicators, that are not shown in FIG. 1 for the sake of clarity.

The processor 102 in the example of FIG. 1 is also communicatively coupled, via the interconnect bus 104, to a cache 122, which may comprise, e.g., a Level 2 (L2) cache, a Level 3 (L3) cache, or a unified cache (UCHE). The cache 110 and the cache 122 together make up a hierarchical cache structure used by the processor-based device 100 to cache frequently accessed data for faster retrieval (compared to retrieving data from the system memory 108).

The processor-based device 100 of FIG. 1 may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include more or fewer elements than illustrated in FIG. 1. For example, the processor 102 may further include more or fewer memory devices execution pipeline stages, controller circuits, buffers, and/or caches, which are omitted from FIG. 1 for the sake of clarity.

As discussed above, the use of a cache such as the cache 110 may not always result in improvements in memory access latency, particularly in aspects in which the processor 102 is a GPU, and the cache 110 is a cluster cache (CCHE) of the GPU. Low cache hit rates may negatively affect overall performance due to the processing and memory access overhead incurred by performing both an unsuccessful cache request to the cache 110 and a subsequent request to the system memory 108 or the cache 122. Accordingly, in this regard, the processor 102 provides an adaptive bypass circuit 124. The adaptive bypass circuit 124 is configured to monitor cache requests to the cache 110 and the results of such requests (i.e., a successful cache access, or "cache hit," in which the requested data is found in the cache 110, or an unsuccessful cache access, or "cache miss," in which the requested data is not found and must be retrieved from the system memory 108 or the cache 122).

In exemplary operation, the adaptive bypass circuit 124 calculates a cache result rate 126 based on one or more outcomes of a corresponding one or more cache requests 128(0)-128(T) to a cache region of the cache 110 during a sampling period. The sampling period may comprise a time interval during which a specified number T of cache requests are received. The cache region may comprise the entire cache or may comprise a single cache line or group of cache lines, as discussed in greater detail below with respect to FIGS. 2 and 3, respectively. The cache result rate 126 may comprise a cache hit rate (i.e., a percentage or fraction of the cache requests 128(0)-128(T) that result in a cache hit) or a cache miss rate (i.e., a percentage or fraction of the cache requests 128(0)-128(T) that result in a cache miss).

The adaptive bypass circuit 124 next determines whether the cache result rate 126 fails to satisfy a cache result requirement (captioned as "CACHE RESULT RQMNT" in FIG. 1) 130. The cache result requirement 130, and the operations for determining whether the cache result rate 126 fails to satisfy the cache result requirement 130, will depend on the statistic used as the cache result rate 126. For example, if the cache result rate 126 is a cache hit rate, the cache result requirement 130 may be a cache hit threshold, and determining whether the cache result rate 126 fails to satisfy the cache result requirement 130 may comprise determining that the cache hit rate is below the cache hit threshold. Similarly, if the cache result rate 126 is a cache miss rate, the cache result requirement 130 may be a cache miss threshold, and determining whether the cache result rate 126 fails to meet the cache result requirement 130 may comprise determining that the cache meet rate exceeds the cache miss threshold.

Upon determining that the cache result rate 126 fails to satisfy the cache result requirement 130, the adaptive bypass circuit 124 restricts access to the cache region (e.g., the entire cache, or a particular cache line or set of cache lines) of the cache 110 subsequent to the sampling period. As used herein, "restricting access" and derivatives thereof refer to the adaptive bypass circuit 124 preventing cache requests from being made to the cache 110 for memory requests to the cache region, and instead routing such memory requests directly to a higher level cache such as the cache 122, or, if such a cache is not provided, to the system memory 108. This may entail entirely disabling the cache 110 as discussed below with respect to FIG. 2, or restricting access to single cache lines or groups of cache lines as discussed below with respect to FIG. 3. In this manner, the cache 110 can be bypassed during time periods during which the cache result rate 126 indicates that use of the cache 110 may provide no benefit, or may even have a negative effect on system performance.

Figure 2:
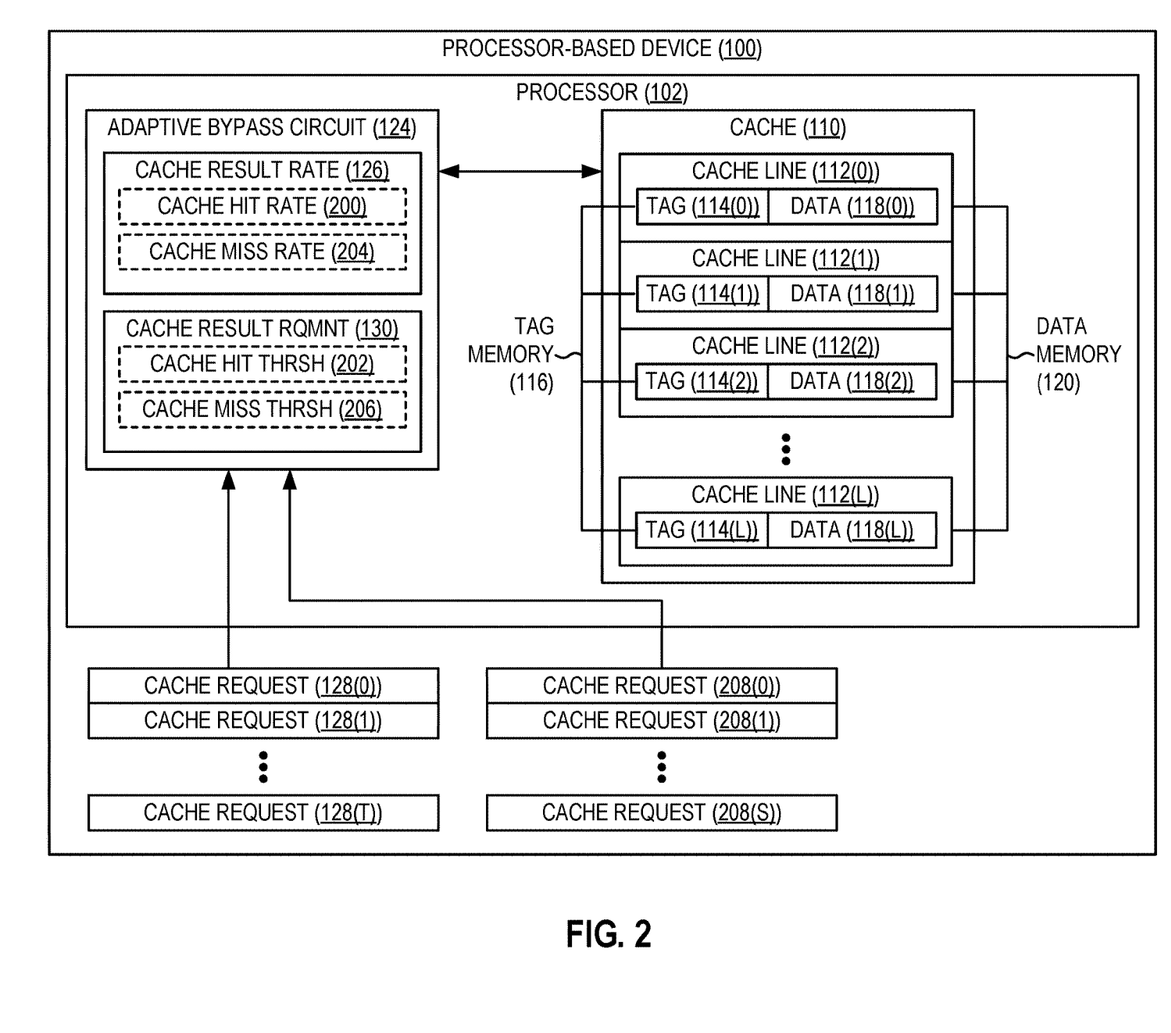
FIG. 2 is a block diagram of an exemplary aspect of the processor-based device of FIG. 1 for providing adaptive cache bypass for an entire cache, according to some aspects.

FIG. 2 illustrates one exemplary aspect of the processor-based device 100 of FIG. 1, in which the adaptive bypass circuit 124 is configured to track the cache result rate 126 for the entire cache 110. In some aspects, the cache result rate 126 may comprise a cache hit rate 200 and the cache result requirement 130 may comprise a cache hit threshold (captioned as "CACHE HIT THRSH" in FIG. 2) 202. Such aspects may provide that the adaptive bypass circuit 124 determines that the cache result rate 126 fails to meet the cache result requirement 130 by determining that the cache hit rate 200 is below the cache hit threshold 202. Some aspects may provide that the cache result rate 126 may comprise a cache miss rate 204 and the cache result requirement 130 may comprise a cache miss threshold (captioned as "CACHE MISS THRSH" in FIG. 2) 206. According to such aspects, the adaptive bypass circuit 124 may determine that the cache result rate 126 fails to meet the cache result requirement 130 by determining that the cache miss rate 204 exceeds the cache miss threshold 206.

It is to be understood that thresholds such as the cache hit threshold 202 and the cache miss threshold 206 may be set to values that are determined based on the needs of specific implementations, and, in some aspects, may be configurable by software processes such as drivers. For example, if an average hit rate for the cache 110 is determined to be 70%, then a driver (not shown) may configure the cache miss threshold 206 with a value of 30%, thus causing the cache 110 to be bypassed when the cache miss rate 204 exceeds 30%. Correctly configuring the cache miss threshold 206 in this example may result in performance benefits as well as power savings. Note, however, that if the cache miss threshold 206 is set to an inappropriate value (e.g., 20%, in the example discussed here), the cache 110 may be bypassed unnecessarily for some memory access operations, which may actually result in greater power consumption due to more frequent accesses to next-higher-level caches.

In the example of FIG. 2, the adaptive bypass circuit 124 restricts access to the cache region (i.e., the entire cache 110) by disabling the cache 110. In aspects where the cache 110 is a read/write cache and thus may contain modified or "dirty" data, the adaptive bypass circuit 124 may first perform a flush of dirty data stored in the cache 110 prior to disabling the cache 110. Some aspects may provide that the adaptive bypass circuit 124 is configured to subsequently re-enable the cache after a reset interval of time has elapsed. The reset interval may be determined based on the needs of specific implementations, and, in some aspects, may be configurable by software processes such as drivers. After re-enabling the cache at the expiration of the reset interval, the adaptive bypass circuit 124 invalidates the contents of the cache. The adaptive bypass circuit 124 in some aspects may then repeat the operations for calculating the cache result rate 126, e.g., to determine whether earlier conditions that caused an unacceptable cache result rate 126 have been resolved, or whether disabling the cache 110 again is appropriate.

In some aspects according to FIG. 2, the adaptive bypass circuit 124 may disable the cache 110 by disabling the data memory 120 of the cache 110 but maintaining continued operation of the tag memory 116 of the cache 110. The adaptive bypass circuit 124 may then continue to update the cache result rate 126 based on a second one or more outcomes of a corresponding second one or more cache requests 208(0)-208(S) to the cache 110. Subsequently, the adaptive bypass circuit 124 may determine whether the cache result rate 126 now satisfies the cache result requirement 130, and, if so, may re-enable the cache 110 and invalidate the contents of the cache 110.

Figure 3:
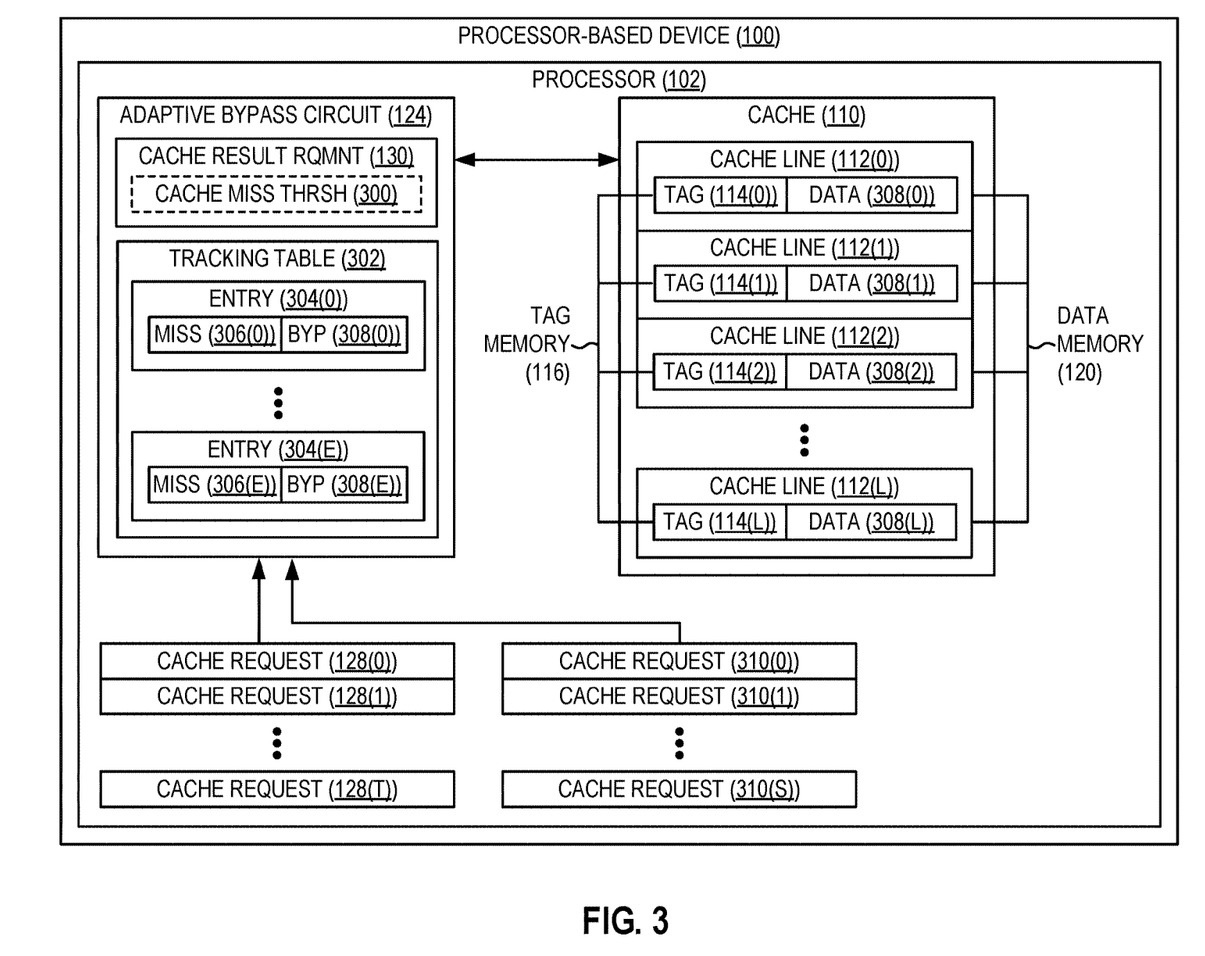
FIG. 3 is a block diagram of an exemplary aspect of the processor-based device of FIG. 1 for providing adaptive cache bypass on a per-cache-region basis, according to some aspects.

FIG. 3 illustrates another exemplary aspect of the processor-based device 100 of FIG. 1, in which the adaptive bypass circuit 124 is configured to track cache request results for each of multiple cache regions within the cache 110. In such aspects, the cache result requirement 130 comprises a cache miss threshold (captioned as "CACHE MISS THRSH" in FIG. 3) 300. The cache miss threshold 300 may be set to a value that is determined based on the needs of specific implementations, and, in some aspects, may be configurable by software processes such as drivers. The adaptive bypass circuit 124 of FIG. 3 includes a tracking table 302 that comprises a plurality of entries 304(0)-304(E), with each of the entries 304(0)-304(E) corresponding to a cache region of the cache 110. For example, in some aspects each of the entries 304(0)-304(E) may correspond to a single one of the cache lines 112(0)-112(L), while some aspects may provide that each of the entries 304(0)-304(E) correspond to a subset of the cache 110 that comprises a plurality of the cache lines 112(0)-112(L). For purposes of illustration, assume that in FIG. 3 each of the entries 304(0)-304(E) corresponds to one of the cache lines 112(0)-112(L), such that the entry 304(0) corresponds to the cache line 112(0), the entry 304(1) (not shown) corresponds to the cache line 112(1), and so forth. The tracking table 302 in some aspects may include additional information not shown in FIG. 3, such as Least Recently Used (LRU) tracking information.

The entries 304(0)-304(E) each include a corresponding cache miss rate indicator (captioned as "MISS" in FIG. 3) 306(0)-306(E) that stores a value indicating a cache miss rate for the entry, as well as a corresponding bypass indicator (captioned as "BYP" in FIG. 3) 308(0)-308(E) that stores a bit value indicating whether the cache 110 should be bypassed for memory access requests to the cache region corresponding to the entry. It is to be understood that the entries 304(0)-304(E) may store additional data, such as validity indicators, cache line addresses, and the like, as non-limiting examples, which are not shown in FIG. 3 for the sake of clarity.

In examples according to FIG. 3, the adaptive bypass circuit 124 is configured to, for each cache request of the one or more cache requests 128(0)-128(T) for which the outcome is a cache miss during the sampling period, determine whether an entry corresponding to the cache region of the cache request is present in the tracking table 302. Thus, for example, if the cache request 128(0) is a miss and is directed to the cache region corresponding to the cache line 112(0), the adaptive bypass circuit 124 will determine whether an entry among the entries 304(0) corresponds to the cache line 112(0). If not, the adaptive bypass circuit 124 adds an entry (such as the entry 304(0)) for the cache line 112(0) among the entries 304(0)-304(E). The adaptive bypass circuit 124 then updates a value of the cache miss rate indicator of that entry corresponding to the cache region of the cache 110 (in this example, the cache miss rate indicator 306(0) of the entry 304(0)). In some examples, if the tracking table 302 is full when the adaptive bypass circuit 124 attempts to add a new entry, the adaptive bypass circuit 124 will apply an LRU replacement policy to select one of the existing entries 304(0)-304(E) for eviction.

When a cache miss rate indicator such as the cache miss rate indicator 306(0) is updated during the sampling period, the adaptive bypass circuit 124 determines whether the value of the cache miss rate indicator exceeds the cache miss threshold 300. If so, the adaptive bypass circuit 124 sets the corresponding bypass indicator of the entry (e.g., the bypass indicator 308(0) of the entry 304(0), in the example above) to indicate that cache requests to the cache region corresponding to the entry should bypass the cache 110. Accordingly, after the sampling period has elapsed, the adaptive bypass circuit 124 may restrict access to the cache region corresponding to the entry (e.g., the cache line 112(0) corresponding to the entry 304(0)) when a cache request to that cache region is received by determining whether a bypass indicator of the entry (e.g., the bypass indicator 308(0)) is set, and, if so, bypassing the cache 110 for that cache request. In some aspects, after the sampling period, the adaptive bypass circuit 124 may continue to update the cache miss rate indicators 306(0)-306(E) for subsequent cache requests 310(0)-310(S) for which the outcome is a cache miss. If the adaptive bypass circuit 124 then determines that the updated value of a cache miss rate indicator of an entry does not exceed the cache miss threshold, the adaptive bypass circuit 124 clears the bypass indicator of the entry.

Figure 4A:
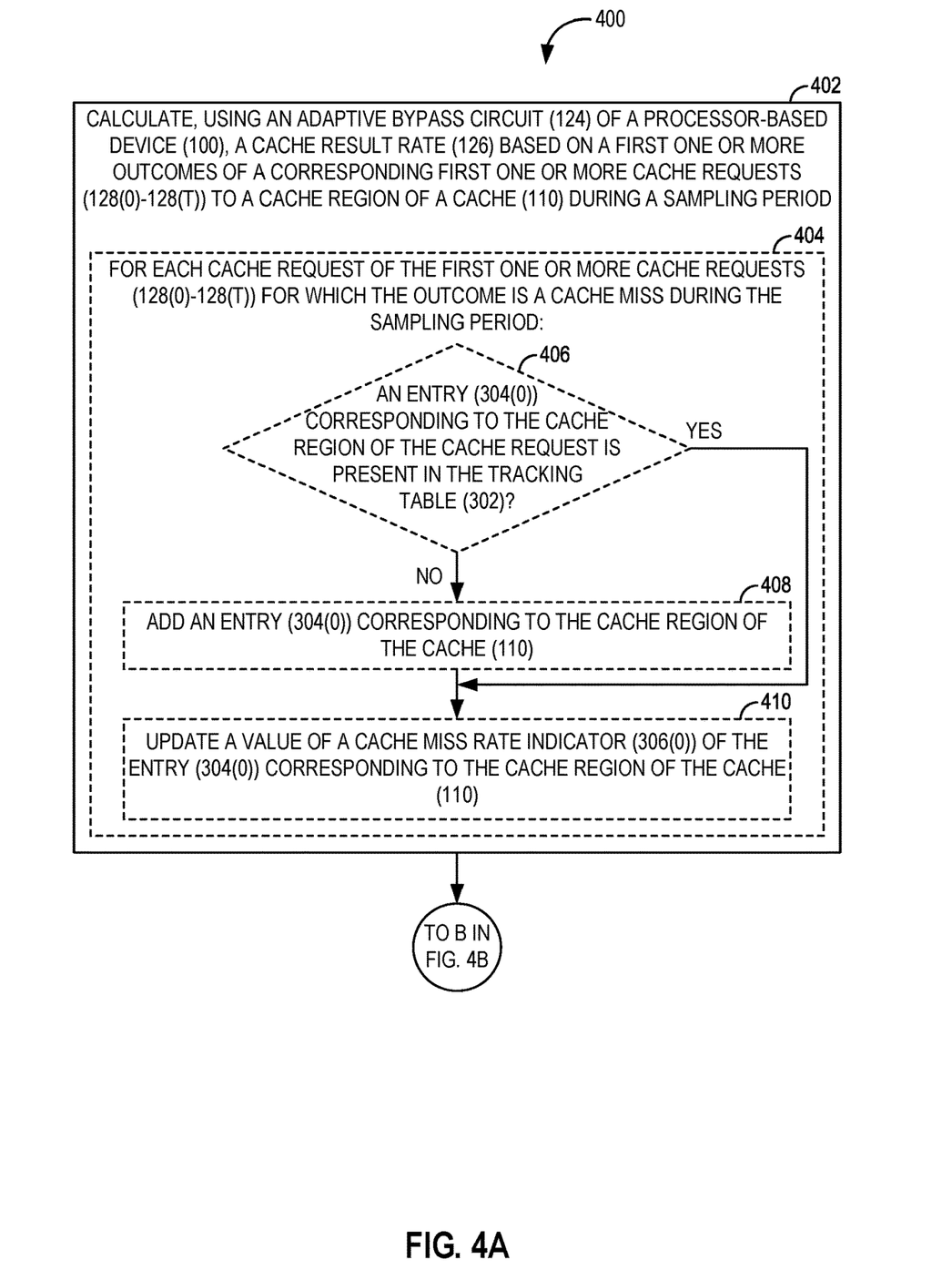
FIGS. 4A-4E are flowcharts illustrating exemplary operations by the adaptive bypass circuit of FIG. 1 for providing adaptive cache bypass, according to some aspects.

To further describe operations of the processor-based device 100 of FIG. 1 for providing adaptive cache bypass, FIGS. 4A-4E provide a flowchart illustrating exemplary operations 400. For the sake of clarity, elements of FIGS. 1-3 are referenced in describing FIGS. 4A-4E. It is to be understood that some aspects may provide that some operations illustrated in FIGS. 4A-4E may be performed in an order other than that illustrated herein and/or may be omitted. In FIG. 4A, the operations 400 begin with the processor 102 of FIG. 1 (e.g., using the adaptive bypass circuit 124 of FIG. 1) calculating a cache result rate (e.g., the cache result rate 126 of FIG. 1) based on a first one or more outcomes of a corresponding first one or more cache requests (e.g., the cache requests 128(0)-128(T) of FIG. 1) to a cache region of a cache (e.g., the cache 110 of FIG. 1) during a sampling period (block 402). In some aspects such as those illustrated in FIG. 3 (in which the cache result rate 126 comprises the cache miss rate indicators 306(0)-306(E) of FIG. 3), the operations of block 402 for calculating the cache result rate 126 may comprise performing a series of operations for each cache request of the first one or more cache requests 128(0)-128(T) for which the outcome is a cache miss during the sampling period (block 404). The adaptive bypass circuit 124 first determines whether an entry, such as the entry 304(0) of FIG. 3, corresponding to the cache region of the cache request is present in a tracking table (e.g., the tracking table 302 of FIG. 3) (block 406). If not, the adaptive bypass circuit 124 adds the entry 304(0) corresponding to the cache region of the cache 110 (block 408). Processing then resumes at block 410. If the adaptive bypass circuit 124 determines at decision block 406 that the entry 304(0) corresponding to the cache region of the cache request is present in the tracking table, the adaptive bypass circuit 124 updates a value of the cache miss rate indicator 306(0) of the entry 304(0) corresponding to the cache region of the cache 110 (block 410). The operations 400 then continue at block 412 of FIG. 4B.

Figure 4B:
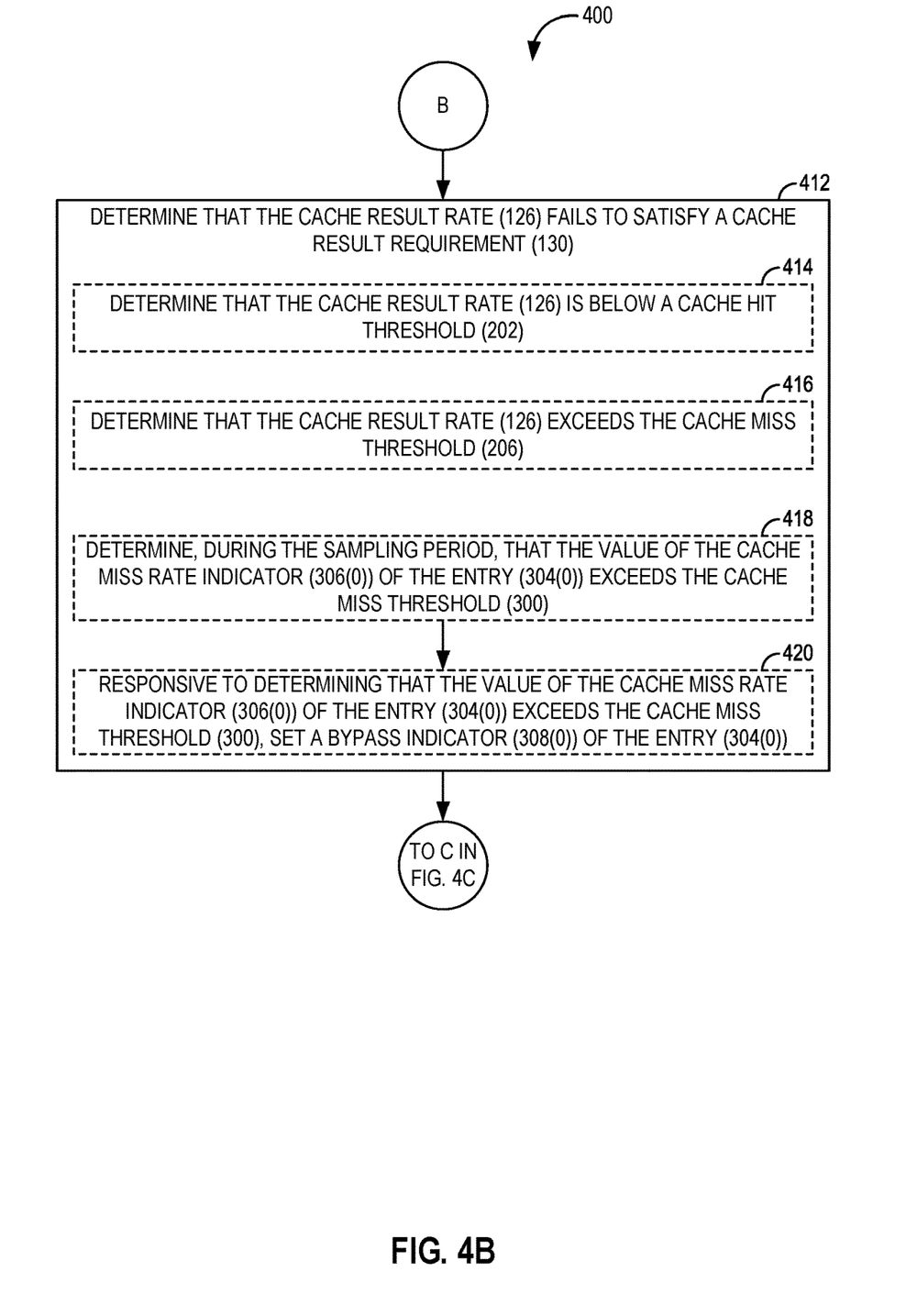

Referring now to FIG. 4B, the operations 400 continue with the adaptive bypass circuit 124 determining that the cache result rate 126 fails to satisfy a cache result requirement, such as the cache result requirement 130 of FIG. 1 (block 412). Some aspects may provide that the operations of block 412 for determining that the cache result rate 126 fails to satisfy the cache result requirement 130 comprises determining that the cache result rate 126 (e.g., the cache hit rate 200 of FIG. 2) is below a cache hit threshold (e.g., the cache hit threshold 202 of FIG. 2) (block 414). According to some aspects, the operations of block 412 for determining that the cache result rate 126 fails to satisfy the cache result requirement 130 may comprise determining that the cache result rate 126 (e.g., the cache miss rate 204 of FIG. 2) exceeds a cache miss threshold (e.g., the cache miss threshold 206 of FIG. 2) (block 416). In some aspects such as those illustrated in FIG. 3, the operations of block 412 for determining that the cache result rate 126 fails to satisfy the cache result requirement 130 may comprise determining, during the sampling period, that the value of the cache miss rate indicator 306(0) of the entry 304(0) exceeds the cache miss threshold 300 (block 418). Responsive to determining that the value of the cache miss rate indicator 306(0) of the entry 304(0) exceeds the cache miss threshold 300, the adaptive bypass circuit 124 sets a bypass indicator 308(0) of the entry 304(0) (block 420). The operations 400 then continue at block 422 of FIG. 4C.

Figure 4C:
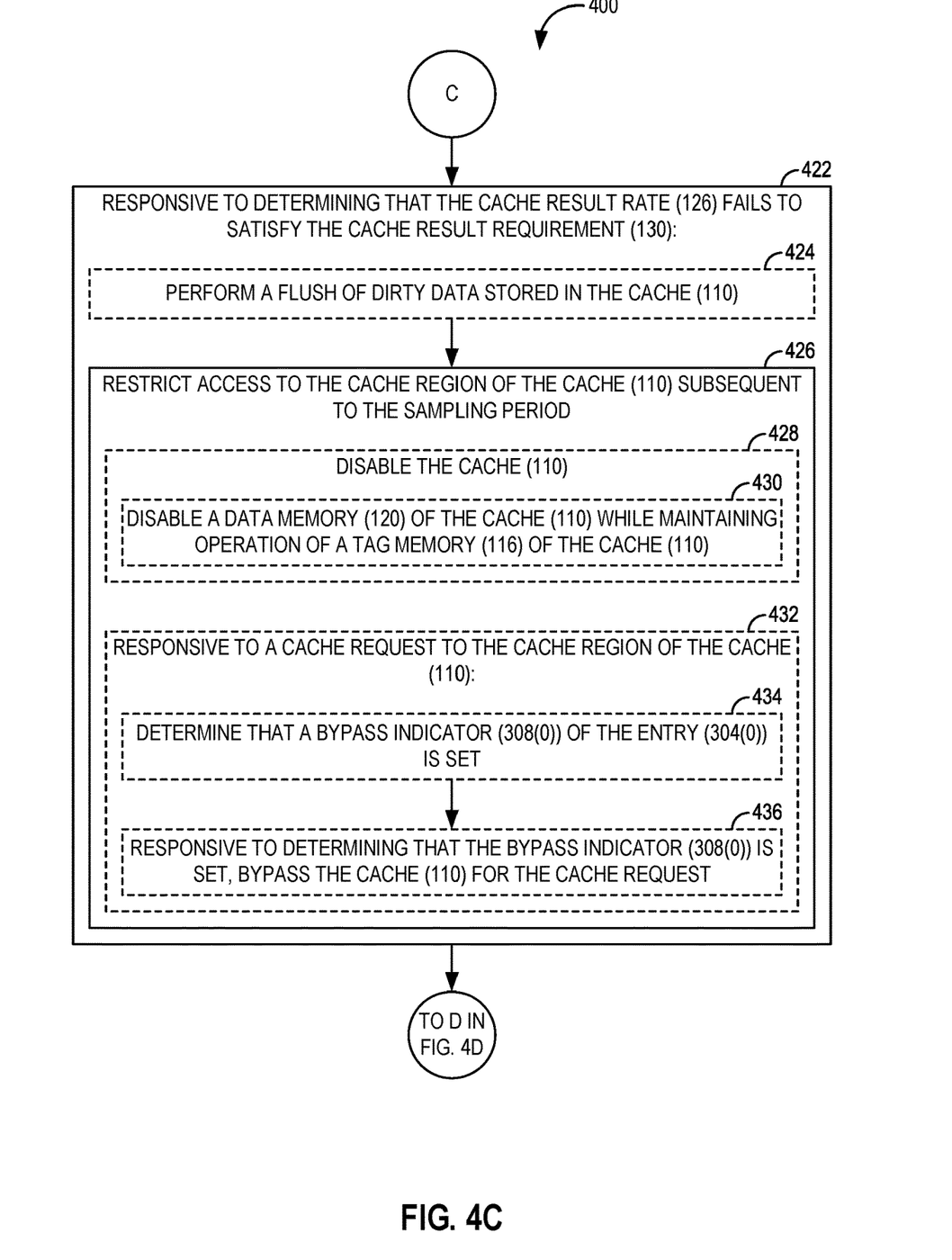

Turning now to FIG. 4C, the operations 400 continue with the adaptive bypass circuit 124 performing a series of operations responsive to determining that the cache result rate 126 fails to satisfy the cache result requirement 130 (block 422). In aspects in which the cache 110 is a read/write cache, the adaptive bypass circuit 124 performs a flush of dirty data stored in the cache 110 (block 424). The adaptive bypass circuit 124 in all aspects restricts access to the cache region of the cache 110 subsequent to the sampling period (block 426). In some aspects such as those illustrated in FIG. 2, the operations of block 426 for restricting access to the cache region of the cache 110 may comprise disabling the cache 110 (block 428). Some aspects illustrated in FIG. 2 may provide that the operations of block 426 for restricting access to the cache region of the cache 110 comprises disabling a data memory (e.g., the data memory 120 of FIG. 1) of the cache 110 while maintaining operation of a tag memory (e.g., the tag memory 116 of FIG. 1) of the cache 110 (block 430). According to aspects illustrated in FIG. 3, the operations of block 426 for restricting access to the cache region of the cache 110 may comprise performing a series of operations responsive to a cache request to the cache region of the cache 110 (block 432). In such aspects, the adaptive bypass circuit 124 determines that a bypass indicator (e.g., the bypass indicator 308(0) of FIG. 3) of the entry 304(0) is set (block 434). Responsive to determining that the bypass indicator 308(0) is set, the adaptive bypass circuit 124 bypasses the cache 110 for the cache request (block 436). The operations 400 in some aspects then continue at block 438 of FIG. 4D.

Figure 4D:
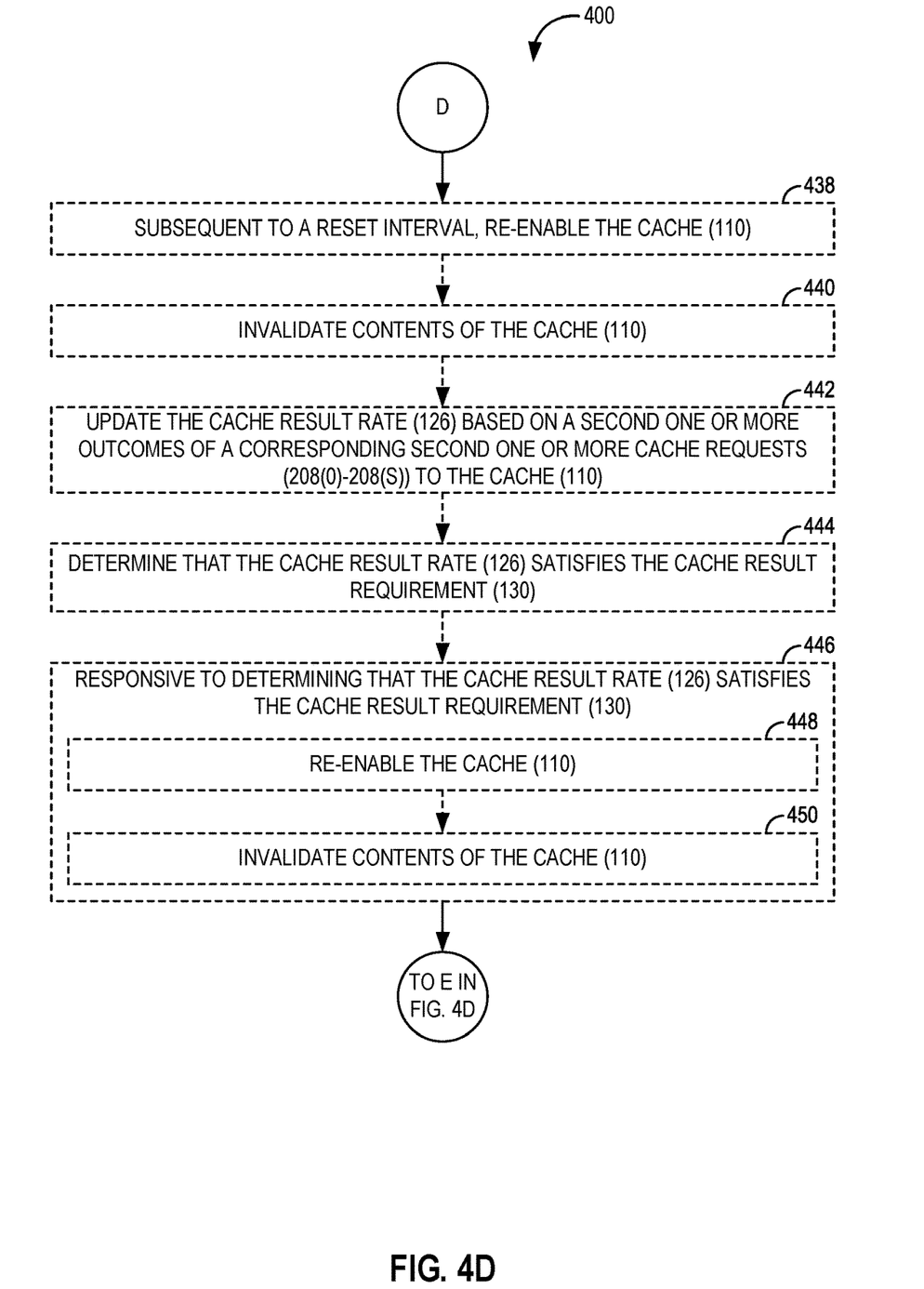

With reference to FIG. 4D, the operations 400 according to some aspects may comprise the adaptive bypass circuit 124, subsequent to a reset interval, re-enabling the cache 110 (block 438). The adaptive bypass circuit 124 then invalidates contents of the cache 110 (block 440). In this manner, a new sampling period may begin during which the adaptive bypass circuit 124 may re-measure the cache result rate 126.

Some aspects may provide that, while the cache 110 is disabled, the adaptive bypass circuit 124 may continue to update the cache result rate 126 based on a second one or more outcomes of a corresponding second one or more cache requests (e.g., the cache requests 208(0)-208(S) of FIG. 2) to the cache 110 (block 442). The adaptive bypass circuit 124 may then determine that the cache result rate 126 satisfies the cache result requirement 130 (block 444). In response to determining that the cache result rate 126 satisfies the cache result requirement 130, the adaptive bypass circuit 124 may perform a series of operations (block 446). The adaptive bypass circuit 124 re-enables the cache 110 (block 448). The adaptive bypass circuit 124 then invalidates contents of the cache 110 (block 450). In some aspects, the operations 400 in some aspects then continue at block 452 of FIG. 4E.

Figure 4E:
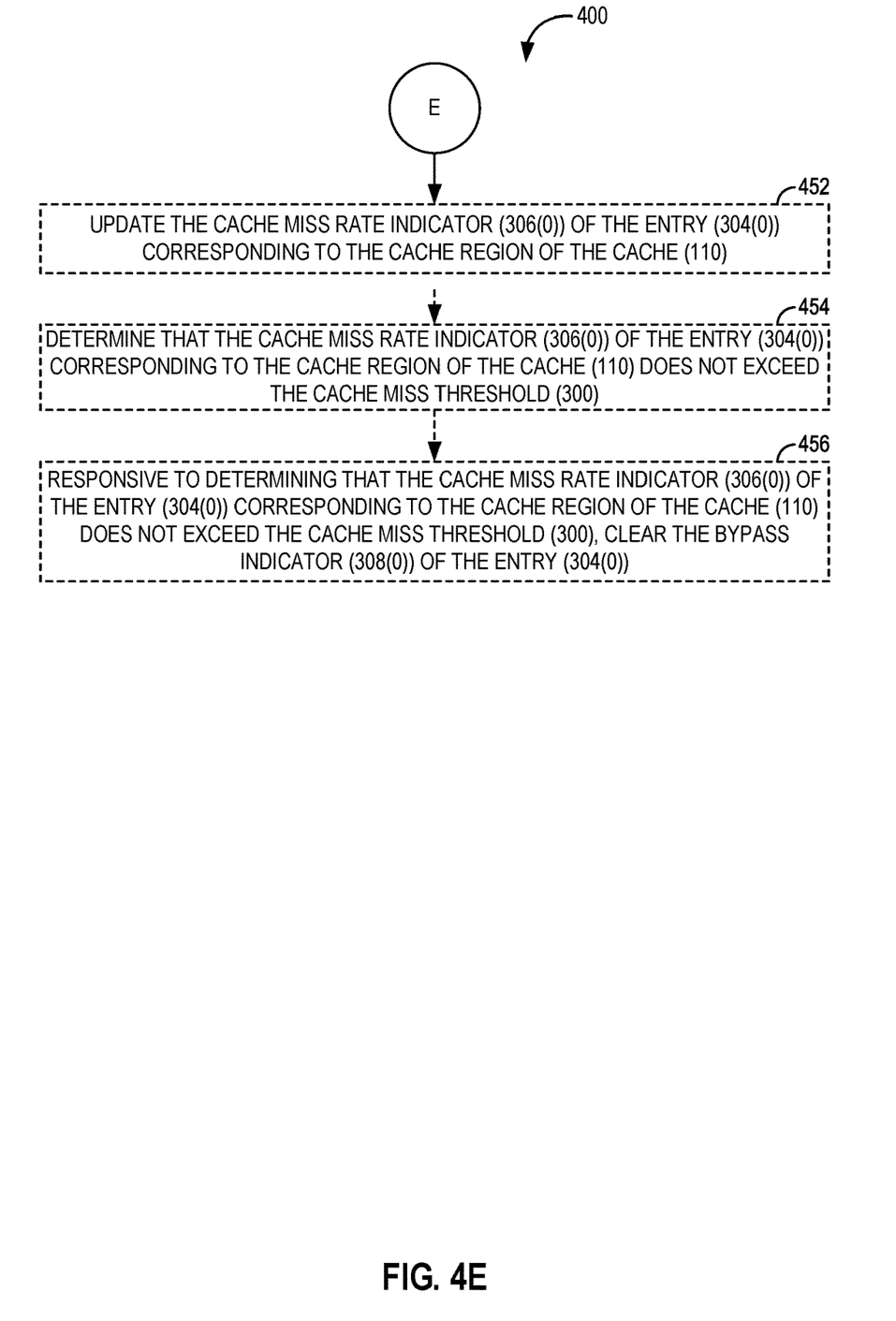

Turning now to FIG. 4E, the operations 400 in aspects illustrated in FIG. 3 may continue with the adaptive bypass circuit 124 updating the cache miss rate indicator 306(0) of the entry 304(0) corresponding to the cache region of the cache 110 (block 452). The adaptive bypass circuit 124 then determines that the cache miss rate indicator 306(0) of the entry 304(0) corresponding to the cache region of the cache 110 does not exceed the cache miss threshold 300 (block 454). In response to determining that the cache miss rate indicator 306(0) of the entry 304(0) corresponding to the cache region of the cache 110 does not exceed the cache miss threshold 300, the adaptive bypass circuit 124 clears the bypass indicator 308(0) of the entry 304(0) (block 456).

Providing adaptive cache bypass in processor-based devices as disclosed in aspects described herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 5:
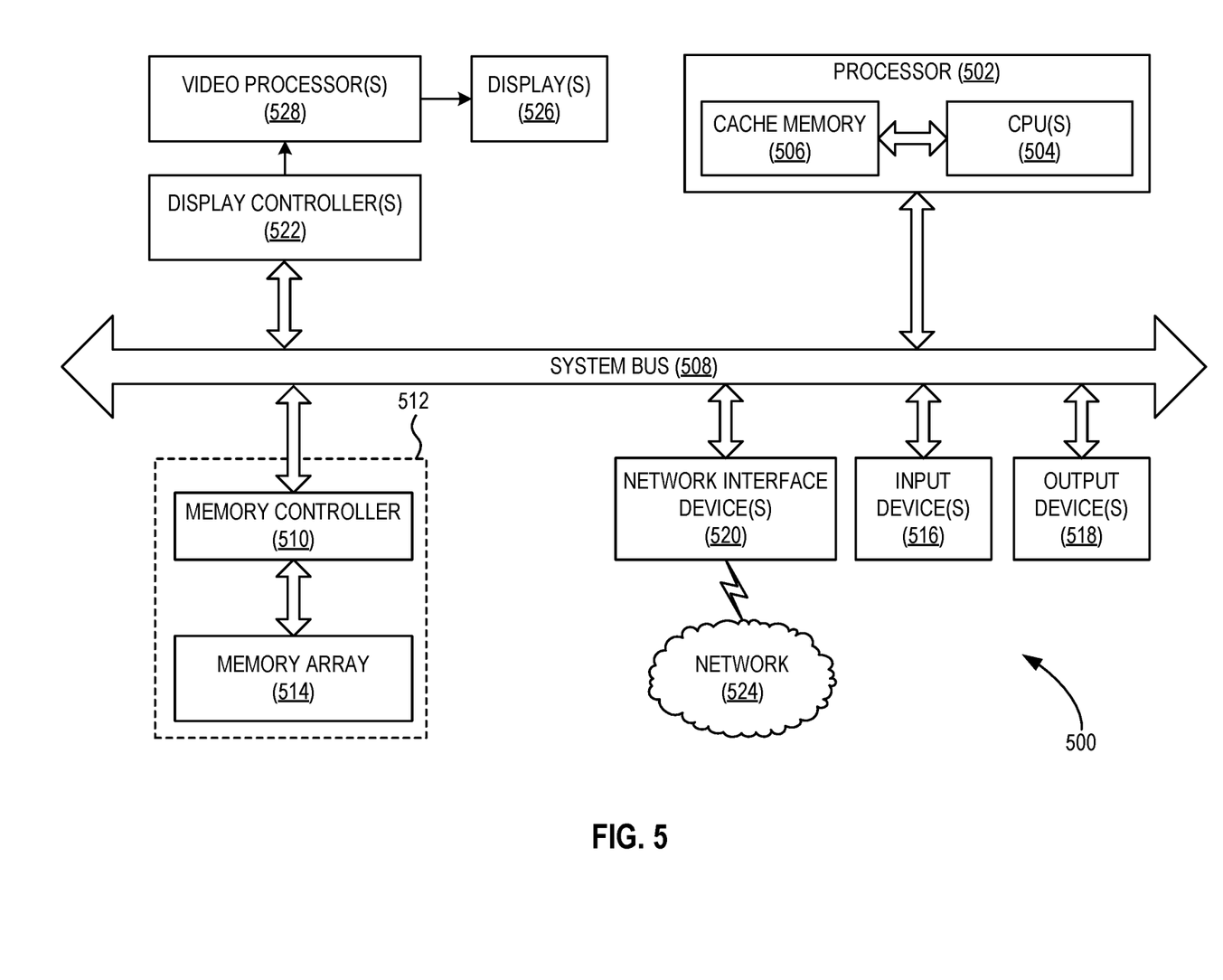
FIG. 5 is a block diagram of an exemplary processor-based device that can include the processor-based device of FIG. 1.

In this regard, FIG. 5 illustrates an example of a processor-based device 500 that may comprise the processor-based device 100 illustrated in FIG. 1. In this example, the processor-based device 500 includes a processor 502 that includes one or more central processing units (captioned as "CPUs" in FIG. 5) 504, which may also be referred to as CPU cores or processor cores. The processor 502 may have cache memory 506 coupled to the processor 502 for rapid access to temporarily stored data. The processor 502 is coupled to a system bus 508 and can intercouple master and slave devices included in the processor-based device 500. As is well known, the processor 502 communicates with these other devices by exchanging address, control, and data information over the system bus 508. For example, the processor 502 can communicate bus transaction requests to a memory controller 510, as an example of a slave device. Although not illustrated in FIG. 5, multiple system buses 508 could be provided, wherein each system bus 508 constitutes a different fabric.

Other master and slave devices can be connected to the system bus 508. As illustrated in FIG. 5, these devices can include a memory system 512 that includes the memory controller 510 and a memory array(s) 514, one or more input devices 516, one or more output devices 518, one or more network interface devices 520, and one or more display controllers 522, as examples. The input device(s) 516 can include any type of input device, including but not limited to input keys, switches, voice processors, etc. The output device(s) 518 can include any type of output device, including, but not limited to, audio, video, other visual indicators, etc. The network interface device(s) 520 can be any device configured to allow exchange of data to and from a network 524. The network 524 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 520 can be configured to support any type of communications protocol desired.

The processor 502 may also be configured to access the display controller(s) 522 over the system bus 508 to control information sent to one or more displays 526. The display controller(s) 522 sends information to the display(s) 526 to be displayed via one or more video processors 528, which process the information to be displayed into a format suitable for the display(s) 526. The display controller(s) 522 and/or the video processors 528 may be comprise or be integrated into a GPU. The display(s) 526 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor-based device, comprising:
    a processor comprising a cache;
    the processor configured to:
        calculate a cache result rate based on a first one or more outcomes of a corresponding first one or more cache requests to a cache region of the cache during a sampling period;
        determine that the cache result rate fails to satisfy a cache result requirement; and
        responsive to determining that the cache result rate fails to satisfy the cache result requirement, restrict access to the cache region of the cache subsequent to the sampling period.
2. The processor-based device of clause 1, wherein:
    the cache region of the cache comprises the entire cache; and
    the processor is configured to restrict access to the cache region of the cache by being configured to disable the cache.
3. The processor-based device of clause 2, wherein:
    the cache result rate comprises a cache hit rate;
    the cache result requirement comprises a cache hit threshold; and
    the processor is configured to determine that the cache result rate fails to satisfy the cache result requirement by being configured to determine that the cache result rate is below the cache hit threshold.
4. The processor-based device of any one of clauses 2-3, wherein:
    the cache result rate comprises a cache miss rate;
    the cache result requirement comprises a cache miss threshold; and
    the processor is configured to determine that the cache result rate fails to satisfy the cache result requirement by being configured to determine that the cache result rate exceeds the cache miss threshold.
5. The processor-based device of any one of clauses 2-4, wherein:
    the cache is a read/write cache; and
    the processor is further configured to, prior to disabling the cache, perform a flush of dirty data stored in the cache.
6. The processor-based device of any one of clauses 2-5, wherein the processor device is further configured to: subsequent to a reset interval, re-enable the cache; and invalidate contents of the cache.
7. The processor-based device of any one of clauses 2-6, wherein:
    the processor is configured to disable the cache by being configured to disable a data memory of the cache while maintaining operation of a tag memory of the cache; and
    the processor is further configured to:
        update the cache result rate based on a second one or more outcomes of a corresponding second one or more cache requests to the cache;
        determine that the cache result rate satisfies the cache result requirement; and
        responsive to determining that the cache result rate satisfies the cache result requirement:
            re-enable the cache; and
            invalidate the contents of the cache.
8. The processor-based device of any one of clauses 1-7, wherein:
    the cache result rate comprises a cache miss rate;
    the processor is configured to calculate the cache result rate by being configured to, for each cache request of the first one or more cache requests for which the outcome is a cache miss during the sampling period:
        determine whether an entry corresponding to the cache region of the cache request is present in a tracking table;
        responsive to determining that the entry is present, update a value of a cache miss rate indicator of the entry corresponding to the cache region of the cache; and
        responsive to determining that the entry is not present, add an entry corresponding to the cache region of the cache;
    the processor is configured to determine that the cache result rate fails to satisfy a cache result requirement by being configured to:
        determine, during the sampling period, whether a value of the cache miss rate indicator of the entry exceeds a cache miss threshold; and
        responsive to determining that a value of the cache miss rate indicator of the entry exceeds the cache miss threshold, set a bypass indicator of the entry; and
    the processor is configured to restrict access to the cache region of the cache by being configured to, responsive to a cache request to the cache region of the cache:
        determining whether a bypass indicator of the entry is set; and
        responsive to determining that the bypass indicator is set, bypass the cache for the cache request.
9. The processor-based device of clause 8, wherein the cache region corresponds to a cache line of the cache.
10. The processor-based device of any one of clauses 8-9, wherein the cache region corresponds to a subset comprising a plurality of cache lines of the cache.
11. The processor-based device of any one of clauses 8-10, wherein the processor is further configured to, for each cache request of a second one or more cache requests to the cache region of the cache for which the outcome is a cache miss:
    update the value of the cache miss rate indicator of the entry corresponding to the cache region of the cache;

determine whether the value of the cache miss rate indicator of the entry corresponding to the cache region of the cache does not exceed the cache miss threshold; and responsive to determining that the value of the cache miss rate indicator of the entry corresponding to the cache region of the cache does not exceed the cache miss threshold, clear the bypass indicator of the entry.

12. The processor-based device of any one of clauses 1-11, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

13. A processor-based device, comprising:
    means for calculating a cache result rate based on a first one or more outcomes of a corresponding first one or more cache requests to a cache region of a cache during a sampling period;
    means for determining that the cache result rate fails to satisfy a cache result requirement; and
    means for restricting access to the cache region of the cache subsequent to the sampling period, responsive to determining that the cache result rate fails to satisfy the cache result requirement.

14. A method for providing adaptive cache bypass, the method comprising:
    calculating, using an adaptive bypass circuit of a processor-based device, a cache result rate based on a first one or more outcomes of a corresponding first one or more cache requests to a cache region of a cache during a sampling period;
    determining that the cache result rate fails to satisfy a cache result requirement; and
    responsive to determining that the cache result rate fails to satisfy the cache result requirement, restricting access to the cache region of the cache subsequent to the sampling period.

15. The method of clause 14, wherein:
    the cache region of the cache comprises the entire cache; and
    restricting access to the cache region of the cache comprises disabling the cache.

16. The method of clause 15, wherein:
    the cache result rate comprises a cache hit rate;
    the cache result requirement comprises a cache hit threshold; and
    determining that the cache result rate fails to satisfy the cache result requirement comprises determining that the cache result rate is below the cache hit threshold.

17. The method of any one of clauses 15-16, wherein:
    the cache result rate comprises a cache miss rate;
    the cache result requirement comprises a cache miss threshold; and
    determining that the cache result rate fails to satisfy the cache result requirement comprises determining that the cache result rate exceeds the cache miss threshold.

18. The method of any one of clauses 15-17, wherein:
    the cache is a read/write cache; and
    the method further comprises, prior to disabling the cache, performing a flush of dirty data stored in the cache.

19. The method of any one of clauses 15-18, wherein the processor-based device is further configured to:
    subsequent to a reset interval, re-enabling the cache; and
    invalidating contents of the cache.

20. The method of any one of clauses 15-19, wherein:
    disabling the cache comprises disabling a data memory of the cache while maintaining operation of a tag memory of the cache; and
    the method further comprises:
        updating the cache result rate based on a second one or more outcomes of a corresponding second one or more cache requests to the cache;
        determining that the cache result rate satisfies the cache result requirement; and
        responsive to determining that the cache result rate satisfies the cache result requirement:
            re-enabling the cache; and
            invalidating contents of the cache.

21. The method of any one of clauses 14-20, wherein:
    the cache result rate comprises a cache miss rate;
    calculate the cache result rate by being configure to, for each cache request of the first one or more cache requests for which the outcome is a cache miss during the sampling period:
        determining that an entry corresponding to the cache region of the cache request is present in a tracking table; and
        responsive to determining that the entry is present, updating a value of a cache miss rate indicator of the entry corresponding to the cache region of the cache;
    determining that the cache result rate fails to satisfy the cache result requirement comprises:
        determining, during the sampling period, that the value of the cache miss rate indicator of the entry exceeds a cache miss threshold; and
        responsive to determining that the value of the cache miss rate indicator of the entry exceeds the cache miss threshold, setting a bypass indicator of the entry; and
    restricting access to the cache region of the cache comprises, responsive to a cache request to the cache region of the cache:
        determining that a bypass indicator of the entry is set; and
        responsive to determining that the bypass indicator is set, bypassing the cache for the cache request.

22. The method of clause 21, wherein the cache region corresponds to a cache line of the cache.

23. The method of any one of clauses 21-22, wherein the cache region corresponds to a subset comprising a plurality of cache lines of the cache.

24. The method of any one of clauses 21-23, wherein the method further comprises, for each cache request of a second one or more cache requests to the cache region of the cache for which the outcome is a cache miss:

updating the value of the cache miss rate indicator of the entry corresponding to the cache region of the cache;

determining that the value of the cache miss rate indicator of the entry corresponding to the cache region of the cache does not exceed the cache miss threshold; and responsive to determining that the value of the cache miss rate indicator of the entry corresponding to the cache region of the cache does not exceed the cache miss threshold, clearing the bypass indicator of the entry.

What is claimed is:

1. A processor-based device, comprising:

a processor comprising a cache;

the processor configured to:

calculate a cache result rate based on a first one or more outcomes of a corresponding first one or more cache requests to a cache region of the cache during a sampling period, wherein the cache region comprises the entire cache;

determine that the cache result rate fails to satisfy a cache result requirement;

responsive to determining that the cache result rate fails to satisfy the cache result requirement, restrict access to the cache region of the cache subsequent to the sampling period by being configured to disable the cache;

subsequent to a predetermined reset interval, re-enable the cache; and invalidate contents of the cache.

2. The processor-based device of claim 1, wherein:

the cache result rate comprises a cache hit rate;

the cache result requirement comprises a cache hit threshold; and the processor is configured to determine that the cache result rate fails to satisfy the cache result requirement by being configured to determine that the cache result rate is below the cache hit threshold.

3. The processor-based device of claim 1, wherein:

the cache result rate comprises a cache miss rate;

the cache result requirement comprises a cache miss threshold; and the processor is configured to determine that the cache result rate fails to satisfy the cache result requirement by being configured to determine that the cache result rate exceeds the cache miss threshold.

4. The processor-based device of claim 1, wherein:

the cache is a read/write cache; and the processor is further configured to, prior to disabling the cache, perform a flush of dirty data stored in the cache.

5. The processor-based device of claim 1, wherein:

the processor is configured to disable the cache by being configured to disable a data memory of the cache while maintaining operation of a tag memory of the cache; and the processor is further configured to:

update the cache result rate based on a second one or more outcomes of a corresponding second one or more cache requests to the cache;

determine that the cache result rate satisfies the cache result requirement; and responsive to determining that the cache result rate satisfies the cache result requirement:

re-enable the cache; and invalidate the contents of the cache.

6. The processor-based device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

7. A method for providing adaptive cache bypass, the method comprising:

calculating, using an adaptive bypass circuit of a processor-based device, a cache result rate based on a first one or more outcomes of a corresponding first one or more cache requests to a cache region of a cache during a sampling period, wherein the cache region comprises the entire cache;

determining that the cache result rate fails to satisfy a cache result requirement;

responsive to determining that the cache result rate fails to satisfy the cache result requirement, restricting access to the cache region of the cache subsequent to the sampling period by disabling the cache;

subsequent to a predetermined reset interval, re-enabling the cache; and invalidating contents of the cache.

8. The method of claim 7, wherein:

the cache result rate comprises a cache hit rate;

the cache result requirement comprises a cache hit threshold; and determining that the cache result rate fails to satisfy the cache result requirement comprises determining that the cache result rate is below the cache hit threshold.

9. The method of claim 7, wherein:

the cache result rate comprises a cache miss rate;

the cache result requirement comprises a cache miss threshold; and determining that the cache result rate fails to satisfy the cache result requirement comprises determining that the cache result rate exceeds the cache miss threshold.

10. The method of claim 7, wherein:

the cache is a read/write cache; and the method further comprises, prior to disabling the cache, performing a flush of dirty data stored in the cache.

11. The method of claim 7, wherein:

disabling the cache comprises disabling a data memory of the cache while maintaining operation of a tag memory of the cache; and the method further comprises:

updating the cache result rate based on a second one or more outcomes of a corresponding second one or more cache requests to the cache;

determining that the cache result rate satisfies the cache result requirement; and responsive to determining that the cache result rate satisfies the cache result requirement:

re-enabling the cache; and invalidating the contents of the cache.

12. A processor-based device, comprising:

a processor comprising a cache;

the processor configured to:

calculate a cache result rate comprising a cache miss rate based on a first one or more outcomes of a corresponding first one or more cache requests to a cache region of the cache during a sampling period by being configured to, for each cache request of the first one or more cache requests for which the outcome is a cache miss during the sampling period:
- determine whether an entry corresponding to the cache region of the cache request is present in a tracking table;
- responsive to determining that the entry is present, update a value of a cache miss rate indicator of the entry corresponding to the cache region of the cache; and
- responsive to determining that the entry is not present, add an entry corresponding to the cache region of the cache;

determine that the cache result rate fails to satisfy a cache result requirement by being configured to:
- determine, during the sampling period, whether the value of the cache miss rate indicator of the entry exceeds a cache miss threshold; and
- responsive to determining that the value of the cache miss rate indicator of the entry exceeds the cache miss threshold, set a bypass indicator of the entry; and responsive to determining that the cache result rate fails to satisfy the cache result requirement, restrict access to the cache region of the cache subsequent to the sampling period by being configured to, responsive to a cache request to the cache region of the cache:
- determine whether the bypass indicator of the entry is set; and
- responsive to determining that the bypass indicator is set, bypass the cache for the cache request.

13. The processor-based device of claim 12, wherein the cache region corresponds to a cache line of the cache.

14. The processor-based device of claim 12, wherein the cache region corresponds to a subset comprising a plurality of cache lines of the cache.

15. The processor-based device of claim 12, wherein the processor is further configured to, for each cache request of a second one or more cache requests to the cache region of the cache for which the outcome is a cache miss:
- update the value of the cache miss rate indicator of the entry corresponding to the cache region of the cache;
- determine whether the value of the cache miss rate indicator of the entry corresponding to the cache region of the cache does not exceed the cache miss threshold; and
- responsive to determining that the value of the cache miss rate indicator of the entry corresponding to the cache region of the cache does not exceed the cache miss threshold, clear the bypass indicator of the entry.

* * * * *